(12) United States Patent
O'Brien

(10) Patent No.: US 6,284,212 B1
(45) Date of Patent: Sep. 4, 2001

(54) METHOD OF NITRIC ACID FORMATION USING A CATALYTIC SOLUTION

(76) Inventor: Robert N. O'Brien, 2614 Queenswood Drive, Victoria, B.C. (CA), V8N 1X5

( * ) Notice: Subject to any disclaimer, the term of this patent is extended or adjusted under 35 U.S.C. 154(b) by 0 days.

(21) Appl. No.: 09/190,730

(22) Filed: Nov. 10, 1998

(51) Int. Cl.$^7$ .................................................. C01B 21/40

(52) U.S. Cl. .............................................................. 423/393

(58) Field of Search ....................................... 423/392, 393

(56) References Cited

U.S. PATENT DOCUMENTS

| | | | |
|---|---|---|---|
| 1,901,816 | 3/1933 | Luscher | 23/157 |
| 2,098,953 | 11/1937 | Christiansen | 23/160 |
| 3,399,965 | 9/1968 | Kalous | 23/162 |
| 3,542,510 | 11/1970 | Newman et al. | 23/160 |
| 3,716,625 | 2/1973 | Oberste-Berghaus et al. | 23/161 |
| 4,064,221 | 12/1977 | Rodrigo et al. | 423/393 |
| 5,017,348 | * 5/1991 | Lerner | 423/393 |
| 5,149,515 | * 9/1992 | Karner et al. | 423/393 |
| 5,302,325 | * 4/1994 | Cheng | 261/76 |
| 5,681,540 | 10/1997 | O'Brien | 423/573.1 |

OTHER PUBLICATIONS

—See attached "Information Disclosures Statement by Applicant".

Chilton, Thomas H.; *The Manufacture of Nitric Acid by the Oxidation of Ammonia*; 1960; Chem. Eng. Progress Monograph Series, No. 3, vol. 56; pp 1–19; Am Inst. Chem. Eng., NY; NY (No month).

* cited by examiner

*Primary Examiner*—Wayne Langel

(57) ABSTRACT

Methods for concentrating nitric acid in aqueous solution are known wherein reduction of some nitric acid initially present in the solution oxidizes nitric oxide obtained for example from exhaust vapors of heterogneously catalytically combusted ammonia, but gas effluence and solution dilution associated with such methods have necessitated recirculation piping to convey fluids of varying content to and fro between separated reactor units adapted to conduct different sub-reactions subsumed under an overall process which is inherently unworkable in batch mode operations. Herein the invention features joint execution of all necessary reactions in a single reactive solution body, and resorts to a liquid phase homogeneous catalysis involving nitrate and/or nitrosyl ions, in a process which is effective whether in continuous or batch processing. Problems with low gas solubilities and diffusivities are resolved when a high enough Hatta Number is attained due to fast free radical-ion reactions in the vicinity of gas-liquid interfaces provided by gas-filled bubbles. Reaction control means include varying the proportion and/or concentration of sulfuric acid blended with nitric acid to constitute a catalytic solution.

4 Claims, 2 Drawing Sheets

METHOD OF NITRIC ACID FORMATION USING A CATALYTIC SOLUTION

BACKGROUND OF THE INVENTION

In general, this invention relates to a process which increases the concentration of nitric acid in an aqueous solution by forming additional nitric acid therein. As hereinafter disclosed, what is proposed involves, basically, a method of jointly conducting reactions having functions which include: oxidation of nitric oxide to form higher oxides of nitrogen; oxidation of reduction products from the foregoing oxidation; and formation of nitric acid, in aqueous solution, from the aforesaid higher oxides of nitrogen and water. Also disclosed is how this method is closely integrated with an extractive distillation process using sulfuric acid.

It is assumed that an exhaust gas stream containing water vapor and nitrogen oxides derived by means of ammonia combustion according to known technology would be the most convenient source, together with a source of oxygen, of feedstream materials either for start-up of a batch production version of a plant incorporating the invention, or for sustaining a continuous mode of production. However, it is feasible to apply the invention in conjunction with alternative sources of oxygen, water, and nitrogen oxides.

The invention more especially relates to a process wherein a negligible portion of total nitric oxide consumed is oxidized according to the known "homogeneous, non-catalytic, gas-phase reaction between nitric oxide and additional oxygen to produce nitrogen dioxide" which is discussed at length by Thomas H. Chilton in *THE MANUFACTURE OF NITRIC ACID BY THE OXIDATION OF AMMONIA*. Unlike other gas phase reactions this one, instead of going faster as temperature is raised, proceeds as a termolecular reaction with a rate constant which diminishes at increasing temperature, thus requiring resort to means to elevate gas pressure—an application of Le Chatelier's Principle—as in the 'Du Pont Pressure Process', in order to oxidize nitric oxide without deceleration of the rate of reaction.

However, an alternative avenue to producing needed higher oxides of nitrogen has been explored by a number of below-cited workers in the art, who represent a divergent branch of nitric acid manufacture wherein the focus is not on means for homogeneous gas phase oxidation of NO. Instead, their apparatus arrangements and processing conditions are directed to a concentrating technique based essentially on interrelating two reactions of the following natures: (a) formation of higher oxides of nitrogen, accompanied by liberation of bound water, by means of reducing nitric acid originating in the condensate of ammonia burner exhaust, using nitric oxide as the reducing agent which is itself oxidized; and (b) formation of nitric acid, together with co-product nitric oxide, by means of water dissolution of higher oxides of nitrogen. Such an approach would be infeasible to conduct in a batch mode of production, because the mass balance situation would entail getting nowhere, but in several issued patents the approach is purported to have utility in continuous production modes.

Among the practitioners of this diverging branch of art, surmisably there would be opinions that certain chemical events regarded hereinafter as undesirable are better understood as irremediable 'givens' necessitating separation of reaction locales, hence the various fluid recirculation systems of the prior art. The undesirable events are not irremediable, it turns out.

One such chemical event is gas effluence; another is solution dilution. It would be expected that co-produced nitric oxide from formation of nitric acid in an aqueous solution would 'gas off', and this could even be viewed as helpful if the plan anyway is to carry the gas onward to another reactor site in a plant, eg. by entraining it into an air-stripping stream. But that is not the plan herein adopted, and NO effluence is viewed as a key problem requiring resolution.

Another key problem also concerns gas effluence, though now effluence of the higher oxides of nitrogen, but in this case accompanied by dilution of reaction solution due to chemical reduction of nitric acid and liberation of water. When the plan anyway is to conduct an absorption-type reaction at a reactor site elsewhere in a plant, this dilution too could be understood as not a problem, or even helpful (at a particular stage). Neither is that the plan herein adopted, however. The problem requires resolution.

These problems of dilution and effluence are associated respectively—although with an overlap regarding effluence—with the two reactions to which attention has already been drawn by way of characterizing their natures (a) and (b) supra, and which next are displayed for didactic purposes, reproducing an evidently unbalanced type of molecular equation notation exactly as presented in a below-cited patent (by M. J. Kalous):

  [I]

$NO + 2HNO_3 \rightarrow 3NO_2 + H_2O$  [I]

  [II]

$3NO_2 + H_2O \rightarrow 2HNO_3 + NO$  [II]

To the clearly shown reversal of reaction direction, may be plausibly attributed an apparent intention among prior art workers employing both reactions, that they should either be conducted at spatially separated locations in different solution bodies, or else at least that there should be provision for separate zones in a current of fluids in which one or the other reaction substantially predominates, though both may occur to some extent in the same flow. Evidence of such intentions is easily detected in apparatus arrangements.

In another below-cited patent (A. Christiansen), notation for describing the same reaction (I) does not similarly fail (as above) to indicate the number of water molecules, reading instead: "$NO + 2HNO_3 \rightarrow 3NO_2 + 3H_2O$"; yet in another patent (L. M. Rodrigo et al), notation for the same reaction reads "$2\ NO_3H + NO + Heat \rightarrow 3NO_2 + H_2O$", again omitting the information that the number of molecules of water liberated is the same as the number of molecules of nitrogen dioxide evolved. It seems that when the context makes it clear that aqueous solutions of nitric acid are involved, some though not all describers of the reaction (I) which reduces nitric acid and produces water along with higher oxides of nitrogen omit from notation both the textbook recommended '(aq)' after '$2HNO_3$', and the number of water molecules directly involved. Surmisably, such notation practice may reflect acceptance of dilution as a given and/or de-emphasis on the magnitude thereof. Seeing such equation notation practices in the art, one should also recall that $HNO_3$ in aqueous solution is completely ionized.

Discussions of reaction (II) in the pertinent prior art frequently give an impression that it can be indifferently regarded whether this reaction involves water with or else without nitrate ion present. But then apparatus arrangements manifest a strong preference for water containing nitrate ion.

More closely looked at in order to advance the art, such reactions known in the prior art are between free radicals and nitrate ions in water, on the one hand; and between free radicals and water molecules in the presence of nitrate ions, on the other hand—where reactant NO and higher oxides of nitrogen, respectively, comprise the free radicals referred to here.

Sometimes in the literature (eg. the patent of Oberste-Berghaus et al, cited below), there is no equation given for reaction [I] and where it is employed is only signaled by mention of 'washing out'. And, in much of the literature, the term 'absorption' signals where reaction [III] is employed. Such conventions of usage may perhaps tend to hinder giving close attention not just to free radical-ion reactions but to macroscopic events accepted as inevitable, such as gas effluence and dilution accompanying reactions.

A third problem area of pertinence requires separate mention, namely: how best to integrate one or another kind of distillation process with a system forming nitric acid in aqueous solution. The options are clear.

In America, the preference is extractive distillation using a strong dehydrating agent, commonly sulfuric acid, whereby a water-nitric acid mixture of any concentration can be separated completely, leaving no azeotrope. Some objections have been raised to this approach. In U.S. Pat. No. 3,542,510 (Newman et al), for example, it is stated with regard to extractive distillation: "Such procedures . . . require large amounts of steam or other heat sources . . . In addition, the use of a dehydrating agent introduces an extraneous chemical agent into the nitric acid system."

The drawback of thermal demands requires attention, of course, but is mitigated even with application of ordinary skill. The thought-provoking issue of an "extraneous chemical agent" seems to voice laudable preference for tightly integrated schemes, and it is appreciated that extractive distillation apparatus and procedures can in fact be merely aggregated with almost any kind of nitric acid manufacturing system, without affecting its principles of operation as a real combination would. It does not follow, however, either that a truly integrated scheme is infeasible, or that sulfuric acid sourced from an extractive distillation unit cannot be used elsewhere than in that unit, non-extraneously.

The other option: ordinary distillation of water-nitric acid mixtures, does appear easier to closely integrate into nitric acid systems per se. Chiefly outside the United States, there are many plants which distill hyperazeotropic nitric acid in a manner yielding a dual output of practically pure nitric acid 'overhead' (for sale) and azeotrope 'bottoms' (for recycling back into an absorption process.) Such 'Direct Strong Nitric' acid concentrating schemes in some respects share common ground with the present invention, although the common ground has nothing to do with which mode of distillation is employed. When there is avoidance of homogeneous gas phase oxidation of nitric oxide, that constitutes the common ground.

Attention is drawn to the following U.S. Pat. Nos.: 1,901,816 (Luscher); 2,098,953 (Christensen); 3,399,965 (Kalous); 3,716,625 (Oberste-Berghaus et al); and, 4,064,221 (Rodrigo et al). By itself it would not say much: that these prior art inventions disclose resort to reaction [II], in view that virtually the whole larger field of art does. However, these also rely on reaction [II] for oxidation of nitric oxide, and of special relevance is the way a mutually enhancing relation between the two reactions is established: characteristically by means of apparatus-related provisions comprising recirculation piping for physical removal of diluted acid solution from a locale where reaction (I) occurs, or at least is the predominant reaction, taking the diluted result elsewhere for participation of its free water content in acid formation according to reaction [II]. Characteristically also is provision to remove nitric oxide from some reaction [II] locale where solution concentration of nitric acid is increased—taking evolved NO back to the locale of reaction [I].

With reference to the Figure in U.S. Pat. No. 3,399,965 (Kalous), at the right side of the Figure, inside "absorption tower 12" there is a vertical bypass "conduit 37" which together with recycling "line 41" provides physical means whereby the inventor obtains mutually enhancing effects of reactions (I) and (II). Perhaps easily overlooked but of special relevance is an unmentioned consequence of the staggered disposition of "conduit 37" and "line 41", respective nearest adjacent outlets and inlets of which are spaced apart. In spaces therebetween, in lower regions of both "absorption zone 29" and "oxidation zone 32", substantial amounts of all reactants for both reactions (I) and (II) are unavoidably present together, manifesting a degree of departure from other inventors' more stringent measures to ensure isolation of the two reactions. Also, this patent shows reactions (I) and (II) both conducted in a single reactor column designated an "absorption" tower though it really is an oxidation tower as well, ie. processes both of oxidation of nitric oxide at the cost of diluting some acid, and of the usual absorption type which increases concentration but evolves NO, are conducted in the same tower 12. This ingenious azeotrope-producing tower is clearly the more important one of the two towers depicted, for its inventor suggests that a system embodying his invention can consist of just this one tower, merely by increasing its size and admitting water to the top. (cf. Col. 7, lines 21–25)

Now referring to the Figure of U.S. Pat. No. 4,064,221 (Rodrigo et al), the conveyance to and fro of reaction products from separate locales manifests a higher degree of intention (than in the invention by M. J. Kalous) to spatially isolate locales respectively for nitric oxide oxidation by means of nitric acid reduction (most intensely conducted in 7), and for formation of new acid (most effective in tower 9, but also conducted in tower 10).

The exploited reactions designated (I) and (II) by M. J. Kalous are designated respectively (IV) and (III) in this citation, which is also pertinent because it illustrates a sub-trend within art employing these reactions: combination with a distillation system—but opting for an easier to integrate ordinary mode. Such objections as are raised in the patent of Newman et al thus do not apply. Insofar as is known from searching, no art within the trend of exploiting what the patent by Rodrigo et al points to as "inverse" reactions discloses integration with extractive distillation.

The invention of Rodrigo et al apparently exemplifies total omission of means for homogeneous gas phase oxidation of nitric oxide, especially if an assertion at Col. 3, lines 30–32, that cooling of reagent gases in heat exchangers 2, 3, and 4 is "irrelevant for the purposes of the patent", is accepted at face value. Somewhat curiously, although it is stated that advantages also accrue from "NO not being handled in the form of a gas" (Col. 2, line 66), the effectiveness of compressor 8 which handles NO certainly depends on it being in the form of a gas. What was really meant may be something like: 'NO formation not being handled by resort to gas phase oxidation.' Notwithstanding the noted curious contrary-to-fact remark (likely an inadvertent translation error), the handling of gas as it is in fact handled would clearly not be impeded by evolution of gas at the top of oxidation system 7, the case being quite the contrary.

SUMMARY OF THE INVENTION

Technical objects of the present invention include:

suppression of NO gas effluence from an aqueous solution in which nitric acid is ionized, and into which NO free radicals are dispersed;

suppression of NO gas effluence from an aqueous solution containing nitric acid, in which $NO_2$ is formed in situ;

elimination of occurrence of dilution of an aqueous solution in which nitric acid is ionized, and into which NO free radicals are dispersed; and, close integration with a method of extractive distillation.

The above technical objects are individually and/or collectively pursued in aid of the following more general nonetheless technical aims:

provision of means for regulating reaction rates without use of and manipulation of substantially above-ambient line pressures;

provision of means for oxidizing nitric oxide to higher oxides of nitrogen without reliance on homogeneous gas phase oxidation; and, contrivance of the means for the immediately foregoing aims in such a manner that formation of nitric acid can proceed without need for conducting different reactions spatially isolated from each other at locations interconnected by recirculation piping.

In other words, key reactions conventionally conducted separately are to be jointly conducted.

The invention arose partly by accident and partly in connection with laboratory research following up U.S. Pat. No. 5,681,540 (O'Brien) for a PROCESS FOR THE RECOVERY OF SULFUR FROM A FEEDSTOCK, and U.S. Pat. No. 5,788,949 (O'Brien) for LIQUID PHASE CONVERSION OF A SOURCE OF SULFUR DIOXIDE TO SULFURIC ACID. In both of these patents by the present inventor, novel uses of solutions containing admixed nitric and sulfuric acids are described.

Nitrosylsulfuric acid made by admixture of nitric and sulfuric acids is called 'nitrous vitriol' and has usually been regarded as a regenerable reagent in connection with the classic 'lead chamber' method of sulfuric acid manufacture. Recent advances in chemistry secured in the present inventor's ongoing research indicate a liquid phase homogeneous catalysis wherein nitrosyl ions act as catalytic entities. They are, it is true, regenerated, and they are reagents, but they must be more than that, for reason that observed acceleration of reaction rates cannot otherwise be accounted for. Regardless of theory, however, grounds of distinction of the present invention from related art in nitric acid manufacture are evident in the role of nitrosylsulfuric acid, or synonymously: of 'nitrous vitriol', specified herein.

It has been found that, under the controlled conditions and with the application of means which are described more fully hereinafter, the amount of nitric acid in a catalytic solution already including ionized nitric acid will be increased without significant gas effluence, without progressive water build-up, and without necessity of conducting separate reactions at different sites interconnected by recirculation piping, when a mixture of previously substantially unreacted oxygen and nitric oxide supplied in the stoichiometric quantities to make nitric acid is injected into nitrous vitriol catalytic solution from the interiors of disappearing bubbles, thus providing oxygen and nitric oxide as free radicals which react with known ions in the solution in at least a three-fold manner, jointly (1) oxidizing the bubbled-in nitric oxide to higher oxides of nitrogen, (2) oxidizing reduced species from the foregoing oxidation, and (3) binding free water.

Although the chemical reaction mechanisms involved are readily conceptualized as just stated and further explicated below, the jointly conducted reactions subserved under the overall process require careful attention to equilibria-controlling conditions, best served by inclusion of means for adjustment of the catalytic effect to produce the desired result, which is of course not a mere demonstration, but is an economical method of making nitric acid to fill customers' orders. Always there must be particularly close attention to maintaining high enough Hatta Number with regard to the bubbled-in oxygen, so that the aforesaid crucial oxidation of reduced species—(2) above—occurs at the rate of a pseudo-first-order-reaction. To this condition, considered together with the typically fast rate of solution reactions between free radicals and ions, is attributed the surprising absence of gas evolution which would normally be expected when a redox involving NO reaction with $HNO_3$ is conducted at near-ambient pressure as well as when $HNO_3$ is formed by dissolution of $NO_2$, with disproportionation to give more NO. $NO_2$ produced at a bubble interface is consumed in the liquid phase, immediately forming new nitric acid constituent ions without evolving gas. Both nitrate ions—not $HNO_3$ in compound form (none is present)—reduced to NO by the redox producing the $NO_2$, and by-product NO from water dissolution of the $NO_2$ are retained in the solution.

This could not be the case without attaining pseudo-first-order-reaction status with regard to the oxygen. The respective solubilities (slight) and diffusivities of NO and $O_2$ would seem to rule out attaining this, but these properties as listed in standard chemical engineering handbooks are always stated without contemplation of a fast reaction at a gas/liquid interface, which is precisely what is recognized in calculation of Hatta Number, H, describing mass transfer with chemical reaction as follows:

$H=(D_A \, k_2 \, C_{BO})^{1/2}/k_L$; where $D_A$ is the diffusion constant of gas A in $cm^2/s$; where $k_2$ is the reaction constant in the liquid interface; where $C_{BO}$ is the concentration of the reactant in the liquid phase at the gas/liquid interface; and where $k_L$ is a reaction constant distant from the interface. The Hatta Number calculation is of known use to characterize a reaction of the general form: A+B–>products.

By resort to such characterization, the present inventor has uncovered an otherwise extremely difficult-to-perceive catalytic effect of nitrosyl and/or nitrate ions present in a solution of fully ionized electrolyte.

On another key feature of the unique manner of jointly conducting reactions taught herein: since the binding of water accompanying acid-forming per se occurs at a rate never less than equal to the rate of liberation of bound water accompanying the jointly conducted reduction, the problem of build-up of total water in the reactor does not arise, and in fact an excess of water beyond the stoichiometric quantity required for nitric acid formation considered by itself—in other words, some 'free water'—must be present in order to promote at the microscopic chemistry scale the mode of ionic dissociation activating the catalysis effect.

It is evident that the underlying reasons for spatial isolation of separate locales for different reactions, as the prior art with gas and liquid recirculation piping, are not factors in the present case and do not compel such design. Yet another consequence of very practical import is owing to the just-mentioned need for free water: the objectionably high regenerative heating requirement (complained of by Newman et al), which normally would be imposed to permit dehydrating agent reuse, can now be greatly reduced, since significantly more than 7% by weight of water can now be left in admixture with the dehydrating agent employed in extractive distillation. In conventional extractive distillation setups using sulfuric acid, it is typically restored to about 93 wt % concentration.

During genesis of the invention, certain data on the two experimental runs were tabulated which seem germane to briefly report here. A stirred vessel reactor containing 422 ml of solution was used, modelling a batch mode of production. For both runs, a water bath kept the temperature of reaction environs at 22° C., and the input of bubbled-in reagent gases in mL/min was 0.3 NO and 0.4 $O_2$.

Run #1 used a solution comprising 0.95 M $H_2SO_4$ and 5.6 M $HNO_3$, whereas run #2 used 8 M $HNO_3$ alone.

At ten minutes into run #1, a volume of brown effluent gas equal to half the input of gases to that point in time had accumulated. The % of NO converted to $HNO_3$ was upon analysis found to be 50%.

However, at one hundred twenty minutes into run #1, there was zero gas effluence, the conversion of NO to $HNO_3$ was 100%, and the solution was pale green.

Run #2, without sulfuric acid, was pale green at only twenty minutes, analysis showing 50% NO conversion, and brown effluent gas formed amounted to half the gas input to that point in time. At sixty minutes, the solution was darker green, brown gas effluent had dropped to one-tenth input of gas, and analysis showed 90% NO conversion to $HNO_3$.

In both runs, continuing the gas input beyond the points in time respectively at which the above-reported highest conversions occurred resulted in diminishing conversion percentages and resumption of a greater extent of gas effluence—a consequence only to be expected in any 'over-run' batch mode of chemical-yielding production, inasmuch as there is an appropriate time for cessation of conversion operations and removal of product from the conversion apparatus.

The stirred reactor runs summarized above involved separately bubbling in the reagent gases, NO and $O_2$, each from its own submerged input tube, and as will next appear this is not the preferred and most effective way to introduce these gases to a catalytic solution according to the invention as embodied, particularly, in apparatus adapted to continuous production. Independently of the stirred reactor experiments, bubble disappearance tests in an 82 cm depth of 16 M $HNO_3$ solution at room temperature were also conducted. Bubble diameters were about 3 mm at point of release from the bottom of the solution column. Four observed results, and conclusions drawn therefrom are as follows:

1. An $O_2$ bubble does not decrease in size when ascending, ie. the oxygen does not react, and reaches the surface of the solution on the average in 3.34 seconds, proving that $O_2$ alone does not oxidize $NO_3^-$ ion (or anything, for that matter) in the solution.

2. An NO bubble will decrease to pinpoint (about 0.03 mm) in only about 5 cm of rising, taking about half a second, proving that NO alone will reduce $NO_3^-$ rapidly.

3. After reduction of the solution by running NO bubbles into it for 3 hours, $O_2$ bubbles will shrink 80% while rising to the top in 4.25 seconds. This proves that separately bubbled-in oxygen will oxidize $NO_2$ reduction products, but by a reaction slower than the reduction using NO (as in 2).

4. After 3 hours of reducing the solution with NO bubbles alone, plus then a half hour sequence injecting $O_2$ bubbles alone, a stoichiometric mixture of NO+$O_2$, together in each bubble, disappears into the solution in only 2 cm of rise and about one-fourth of a second. This proves that a stoichiometric mixture of $O_2$ and NO both reduces $NO_3^-$ and reoxidizes any reduction products faster than NO by itself reduces $NO_3^-$.

The conclusions above are valid even without the presence of $NO^+$, nitrosyl ion, from $H_2SO_4$, and from consideration of these points together with the stirred reactor tests (especially run #1) it is revealed that the greatest catalytic effect is obtained using nitrous vitriol solution, but that a still impressive effect is obtainable without having sulfuric acid in admixture with aqueous $HNO_3$.

The inventor being occupied during the experiments with calculations of oxygen Hatta Number, reaching 100 in the best case, at first not much was made of the fact that the supposedly 'inverse' reactions of importance in prior art mentioned above were concomittantly sustained—until consumption of all oxides of nitrogen was effected—in a single body of liquid. When applications considerations came to the fore, however, this fact was recognized as the linchpin of a breakthrough in simplification of apparatus.

In accordance with the best mode contemplated of putting the invention into practice, only a single reactor unit is employed, into which two distinctly comprised liquid feedstreams are led, one of said feedstreams comprising dilute aqueous nitric acid conveniently derived as the condensate of exhaust from ammonia combustion, and the other comprising sulfuric acid concentrated without necessity however of removing all water. Mixed together in proportions within the useful range specified below, the two acids provide a regenerable catalytic solution from which the net yield of reaction products therein engendered by bubbling in NO and $O_2$ is sent to an extractive distillation unit for removal of nitric acid content thereof.

In certain market circumstances the yield of nitrous vitriol of high nitric acid content may be saleable, permitting omission of extractive distillation and entailing a mode of practicing the invention that consumes sulfuric acid by leaving it in the product sold. Thus is provided a flexible arrangement which will be better understood from examination of the two accompanying figures of drawing and the following description in detail of a preferred embodiment of the invention with reference thereto.

DETAILED DESCRIPTION OF THE INVENTION

Figure 1:
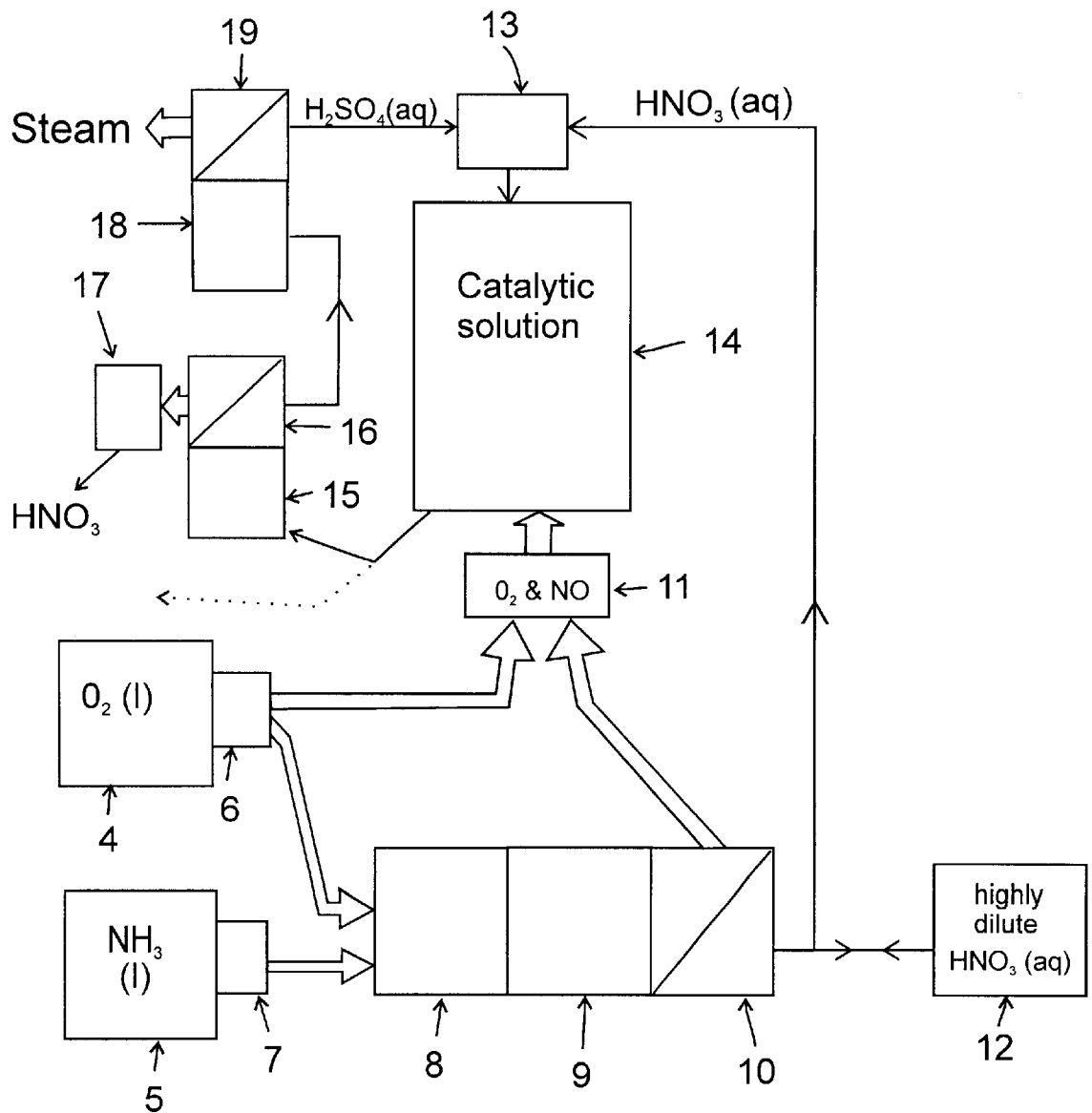
FIG. 1 is a schematic diagram of a preferred arrangement of production elements for implementing the invention.

With reference to FIG. 1, from preferably liquified stores 4 and 5 respectively of oxygen and liquid ammonia, gaseous streams discharged from evaporators 6 and 7 flow to ammonia catalytic combustor 8, the output of which exhausts through heat exchange means 9, thence after cooling into condenser 10, where, as expected, the separated output of ammonia combustion comprises a liquid phase and a gaseous phase, the former consisting essentially of a highly dilute aqueous nitric acid solution, and the latter consisting essentially of nitric oxide. A second gaseous stream from oxygen evaporator 6 joins with gaseous nitric oxide streaming from the condensor 10, the two gases entering gas bubbling means 11 which disperses them into a volume within reactor 14 of the catalytic solution.

Cooled liquid blending means 13 normally receives two liquid phase feedstreams: one from either condensor 10 directly or else from store unit 12, this stream comprising the dilute aqueous nitric acid; the other stream comprising sulfuric acid in admixture with a greater or lesser proportion of water, depending on the extent of separation of water in steam form in rectifier 19 from which the sulfuric acid is normally received by blender 13, the function of which is to prepare a catalytic solution of a desired degree of effectiveness for use as the body of liquid into which correctly proportioned mixed oxygen and nitric oxide gases in bubbles from bubbling means 11 are injected.

From laboratory experiments it has been ascertained that mole proportions with respect to a useful range of nitric-sulfuric acid contents of a blende, preferably are from 0.1 M and up for the nitric acid content and from 6 to about 10 M for the sulfuric acid content. These mole proportions do not of course pertain directly to concentration/dilution regarding water, but this seems a good place to note that the solution must not be too strong in $H_2SO_4$, since at about 14 M thereof free water becomes scarce.

The liquid output withdrawn from reactor 14 will, due to the process of jointly conducted catalyzed liquid phase reactions (detailed below with reference to FIG. 2), possess a high nitric acid content, but which is still in admixture with aqueous nitrous vitriol when withdrawn. This output is sent through heater 15 and into rectifier 16 from which vaporized nitric acid then proceeds into cooler 17, yielding the product. Because nitric acid boils at 83° C., this step certainly imposes no great thermal demand.

From rectifier 16, water-sulfuric acid mixture flows through heater 18 to rectifier 19 already mentioned. It is an easy matter to regulate the amount of water boiled off, ie. steam generated, by means of heat input and/or flow rate control in the simple regeneration assembly comprised by units 18 and 19.

The illustrated scheme is thought to be the first nitric acid forming system known to include sulfuric acid in a solution into which NO and $O_2$ gases are bubbled; and perhaps also unique for this type art is leaving substantial water with sulfuric acid used in extractive distillation.

Before leaving the flowchart provided by FIG. 1, a highly significant point to note concerning flow of substances into and from reactor 14 is that, whereas both gaseous and liquid phase substances flow in, outflow specifically therefrom is substantially confined to liquid phase material. This would not be feasible without attainment in the manner described of a high Hatta Number for $O_2$ oxidation of reduced species in the solution.

Figure 2:
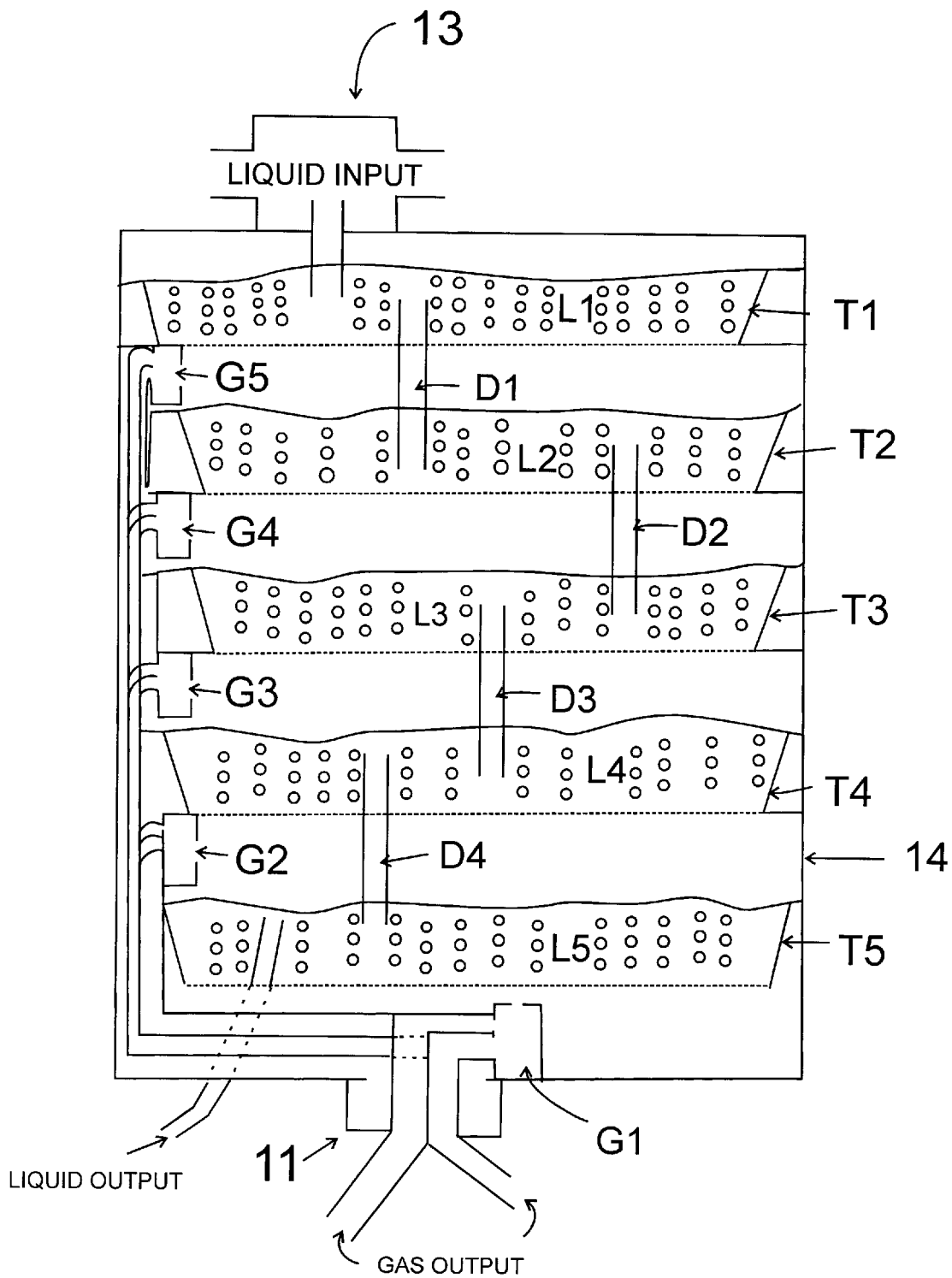
FIG. 2 illustrates in half-section a multi-trayed reactor column wherein reaction mechanisms in accordance with the invention are jointly conducted.

Reference now to FIG. 2 commences with a disclaimer: that the type of multi-tray reactor 14 illustrated is not essential to practicing the invention. A stirred reactor, or alternatively a plug flow reactor, could also be adapted to carrying out the invention. Reasons for preferring a reactor such as that shown include its suitability for continuous as distinct from batch type production, ease of applying cooling means where needed, and the feasibility of tapping any of the trays for withdrawal of partly converted product either as a product itself for some purpose or to assist in exercising control over the reaction. Although not shown, in other words, there could easily be taps at each tray leading to separate stores of solution at the various concentrations reached in each tray. More generally, the existing state of apparatus construction technology is also highly favourable, and the tradition of using multi-trayed reactors in nitric acid production is certainly also well established.

The five trays, T1–T5, are shown in a simplified not-to-scale schematic manner to be perforated, and recourse to conventional technology for making such trays is assumed, ie. gas rises through the tray bottoms through which liquid in the trays does not fall. Vertical downcomers D1–D4 provide means for flow of liquid from higher to lower trays.

In view of superficial resemblance to apparatus employed in previously taught methods of nitric acid manufacture, emphasis here must be placed on more the process enacted than the physical structures employed. Though they conceivably could be misconstrued as to their function, for example, the open volumes spaced between the surfaces of liquid bodies L2–L5 and tray bottoms respectively overlying them are not 'pause zones' intended to accomodate gas phase oxidation of NO with $O_2$. The vertical separation between trays is provided at distances sufficient to prevent splashing and foaming (from vigorous reactions) from interfering with the gas-bubbling aspect of operations.

The NO and $O_2$ fed into reactor 14 are supplied in proportioned blends allocated to each level, differently than would be the case if the process were conducted using but a single tray, though the process and results are the same in either instance. At each level it is intended that all gas bubbled into that particular liquid body is consumed in reactions in the solution, not that a flow of chemically changing reaction by-product gases proceeds upwardly through successive treatment zones of a different character at different levels. At no level should the liquid in a tray off-gas reaction by-products. Gas proportioning means G1–G5 will inject a local 'excess' 'deficiency' of bubbled-in reactant which due to the ongoing flow through downcomers D1–D4 equalizes overall to the stoichiometry which would be required in the case of a non-flowing single-body batch mode of production.

Overall stoichiometry, based on use of an aqueous nitric acid catalytic solution and the herein-described high Hatta Number attaining gas-bubbling technique, is calculable by reference to an equation which describes the overall process without breaking it down either into the subsumed jointly conducted reaction mechanisms, or into distributed 'sub-proportions' per tray level, reading:

$$4NO(aq)+3O_2(aq)+2H_2O \longrightarrow 4HNO_3(aq). \tag{III}$$

This equation sufficiently provides a basis for normal engineering calculations which do not need to be gone into here inasmuch as they are well within the skill level prevalent in this field of art. One of two issues remaining to be clarified, however, is the nature of the proposed allocated distribution of gas blend 'injections' at different levels, with reference to the specific multi-tray type apparatus illustrated in FIG. 2. This proposal has not to do directly with the essence of the invention, but meets needs imposed by expected differences in processing conditions of the nature which always arises when points concerning batch versus continuous output modes of production in accordance with a specified fundamental process which is conceptually the same, in each case, are considered.

Optimal depth of catalytic solution into which NO and $O_2$ bubble is the chief underlying limiting factor which accounts for those differences. Laboratory tests have demonstrated conclusively that about 7 cm depth of catalytic solution suffices for complete conversion of nitrogen oxides to nitric acid. Large-scale batch-type production conveivably could therefor proceed with use of one huge tray (not shown) of as great dimensions in tray width and length as plant property acquisition would permit. Depths of a non-flowing large body of solution substantially greater than 7 cm, say by several times that optimal depth, could conceivably be managed by arranging submerged gas bubbling means at different levels within the large liquid body. This is not a very practical idea, however, and its execution would anyway be complicated by the greater pressure at greater depths due to weight of overlying liquid. Obviously then, line pressure for gas bubbling from different depths would have to vary, in order to obtain optimally scaled bubbles of about 3 mm each initially at point of release, but it is thought that yet further complications would arise due to convective forces. Such forces would not be entirely just thermal in character, but to some extent would involve concentration-impelled convection. Turbulence associated therewith then would affect local pressures in a classically difficult-to-predict-and-control manner. Thus, while batch-type production using large apparatus is feasible, that would be attended by more complex considerations and calculations than with the set-up of FIG. 2 wherein line pressure need be only about 1.25 atmospheric.

One sometimes encounters responses to proposals for multi-leveled apparatus wherein someone may remark that stacking individual units is a rather obvious expedient, particularly when existing plant site dimensions place greater constraint on floor space than on height. Such a remark fails to take into consideration the qualitative distinction between a stack of trays, each accomodating identical batch-type processes (in which case the remark is valid), on the one hand, and a stack of trays manifesting a cascading flow of liquid and a continuous production mode, on the other hand. FIG. 2 does not illustrate a stack of batch-processing units, and the basic purpose of the stacking is not floorspace optimization though that is certainly a welcome result. The primary technical purpose is to divide a continuous gravity-driven flow of liquid, not intended to exceed a particular depth, into sub-volumes of liquid into which vertically ascendant bubbled-in gases are conveniently injected. Several of the practical reasons for this approach—ie. its operational advantages—were previously noted above.

Because a cascaded flow subjected to treatment at different sub-volume regions thereof is shown, the localized allocation of gas proportions injected through the perforated bottoms of trays T1–T5 varies, though the net proportioning of NO and $O_2$, overall, is as reaction equation (III) directs. The plan is to have locally 'over-abundant' $O_2$ nearer the bottom of flow through reactor 14. entailing an allocated proportionate 'deficiency' of injected NO also nearer the bottom. Lest there be concern that gassing off at the top tray T1 is thus risked, it is noted that the reactive solution is not resting as a batch-treated body in this tray anymore than elsewhere below. Downcomers D1–D5 see to the sufficiently fast removal downwardly of solution into ever-richer oxygenated conditions, plus it is not intended to fall below a minimum of necessary $O_2$ even at tray T1. The calculations of such matters as: downcomer scaling, flow rates, and allocated sub-proportioning of admixed gases for the different levels, have already been said to be within the ability of chemical engineers accustomed to set-up details of nitric acid-making apparatus, given that they will now be armed with the concept of the invention.

The final remaining issue requiring clarification concerns the nature of the difference between employing as catalytic solution the nitrous vitriol blend or 'straight' dilute nitric acid. Essential in either instance is the presence of ionic nitrogen oxides. The difference is that nitrosyl ion, $NO^+$, dominates the catalysis in the former instance, whereas nitrate ion, $NO_3^-$, in the same role suffices in the latter instance. In view that nitrosyl is the more powerful oxidizing agent, it comes as no surprise that when $H_2SO_4$ is present so as to generate nitrosyl in the manner known from previous work, the reaction is speeded up by a factor of about 2. The range of useful proportions indicated above with regard to the two acids thus provided at one extreme the twice-as-fast reaction, with lesser effect down the range to the other extreme where only nitrate ion and not nitrosyl is involved. With regard to whether one needs full ionic equation notation representing circumstances of all subsumed reactions when the optimal nitrous vitriol blend is employed as the catalytic solution, this is not considered necessary since the proportioning of NO and $O_2$ feed gases dictated by the simple molecular equation notation of reaction (III) is as applicable in the one instance as the other though doubtlessly competent chemical engineers applying the invention will find it interesting to write out their complete and net ionic equation notations, even as minutely would characterize states of affairs in liquid at different tray levels.

This invention is far from being a mere use of bubbles to increase contact area between normally rather difficult to react (with one another) gas and liquid phase substances. Hatta Number calculations, as explained, show how dramatically different is a reaction in the liquid phase at a bubble interface, from conventional gas-liquid 'contact' type reactions wherein solubilities and diffusivities do impose the limitations inferrable from handbook data tabulations. An oxygen Hatta Number of 100 has been reached in prototype version of the invention, indicating that the reoxidation of reduced species normally resulting when nitric acid is the oxidant of NO reaches the level of a rapid pseudo-first-order-reaction.

Recalling that test apparatus for successful prototype conversions of feedstream materials to nitric acid comprised a simple stirred reactor, it is noted that that and other forms of reactors would be easily adapted to the process by persons skilled in the art, to whom however the type of set-up shown in FIG. 2 is highly recommended. As a further (unillustrated) suggestion of one of many alternative forms of apparatus suited to carrying out the invention, which will occur to competent persons of skill in the art, it may be noted that since the optimal depth of catalytic solution has now been taught, among other things, this factor can be manipulated to good effect in a pyramid-type cascade tower. The depth of solution in a lower-most tray could be significantly less than 5–7 cm, to allow an excess of unreacted mixed gases to pass upwardly to a smaller tray or succession of increasingly smaller trays bearing proportionately diminished depths of liquid calculated to consume just the desired remaining quantity of gases. Such a variant coincidentally shows that the allocated sub-proportioning of gas mixture in connection with the apparatus type illustrated by FIG. 2 is in large part convenient because it is usual to prefer multiple trays in a tower reactor to be all of the same linear dimensions. The projected pyramid-type cascade using differently dimensioned trays lends itself to straightforward release at the bottom of a bubbled gas mixture which would need to be correctly proportioned but once.

Advantages of the invention may be inferred easily from the success with which it meets the technical objects set out in the SUMMARY above; and, against the BACKGROUND which has been provided, it is easily seen that the invention advances the art by avoiding gas phase oxidation of NO without the usual implication that recirculation piping structures between separated reactors are needed to handle spent oxidant, reduced $HNO_3$ (aq). Besides this advantage, too, the prior art instances of oxidizing NO by means of reducing some nitric acid do no lend themselves to embodiment in any but continuous processing type apparatus arrangements, whereas the present invention is equally well applicable to either continuous or batch modes of production.

What is claimed is:

1. In a process for treating an aqueous solution that at commencement of said process contains both nitric acid and sulfuric acid constitutes in predetermined amounts and that procures at conclusion of said process a greater amount of said nitric acid constituent than at commencement of said process, the improvement comprising:

(a), preparing an initially consisted nitrosylsulfuric acid solution to constitute said aqueous solution at commencement of said process, by combining an aqueous nitric acid constituent with an aqueous sulfuric acid constituent, wherein the mole proportions of the nitric-sulfuric acid contents of said nitrosylsulfuric acid solution are from 0.1 M and up for the nitric acid content and from 6 about 10 M for the sulfuric acid content in order to ensure that said solution contains free water, nitrate ions, and nitrosyl ions;

(b), treating said nitrosylsulfuric acid solution in accordance with a a next-defined step, viz. step (c), during solution confinement within a single reactor unit without solution transfer into and/or back and forth from any other reactor unit; and, (c), supplying to said nitrosylsulfuric acid solution within said single reactor unit free radicals of oxygen and nitric oxide that react with said nitrate and nitrosyl ions, by intimately contacting said solution with stoichiometric quantities of gaseous oxygen and gaseous nitric oxide, thereby forming in said solution, while binding free water, an amount of nitric acid constituent in excess of the amount of nitric acid constituent in said nitrosylsulfuric acid solution as initially consisted per step (a).

2. The process of claim 1, wherein an adaptation of said process for continuous production of nitrosylsulfuric acid solution containing a greater amount of nitric acid constituent than that of said initially consisted nitrosylsulfuric acid solution at commencement of said process includes:

(a), enacting said adaptation with provision of said single reactor unit in a column form comprising multiple stacked perforated trays each supporting a quantity of nitrosylsulfuric acid solution, and each tray including a downcomer through which a stream of treated solution is delivered to a next lower tray except in the case of a lowermost tray;

(b) continuously delivering said stoichiometric quantities of gaseous oxygen and gaseous nitric oxide upwardly through tray perforations in the bottoms of said trays, thereby to produce intimate contact of said free radicals of said oxygen and nitric oxide gases with said nitrate and nitrosyl ions contained in said solution supported on each tray;

(c), feeding continuously into a topmost tray of said reactor unit in said column form a stream of said initially consisted nitrosylsulfuric acid solution; and, (d) withdrawing via a solution-conducting outlet from said lowermost tray continuously produced nitrosylsulfuric acid solution containing a greater amount of nitric acid constituent than is contained in said solution as initially consisted when fed to said topmost tray.

3. The process of claim 2, including proportioning the amounts of said gaseous oxygen and nitric oxide delivered through said perforations in a manner delivering a relatively greater proportion of nitric oxide gas into said solution on each successively higher tray, and delivering a relatively greater proportion of said oxygen gas into said solution on each successively lower tray, without in practicing said adaptation departure from supplying said gases in stoichiometric quantities, relative to overall enactment of said process.

4. The process of either claim 1 or 2, including (a), supplying said aqueous sulfuric acid constituent for combination with said aqueous nitric acid constituent when preparing said initially consisted nitrosylsulfuric acid solution from a stream of water-diluted sulfuric acid discharged during an extractive distillation process enacted with use of apparatus distinct from said single reactor unit wherein treatment of nitrosylsulfuric acid solution proceeds; and, (b), supplying said aqueous nitric acid constituent for combination with said aqueous sulfuric acid constituent when preparing said initially consisted nitrosylsulfuric acid solution from condensate of an ammonia combustion process enacted with apparatus distinct from said single reactor unit wherein treatment of nitrosylsulfuric acid solution proceeds.

* * * * *